Sept. 16, 1941.    P. D. DOLE    2,256,382
SURGICAL LIGATURE APPLICATOR
Filed March 6, 1939    4 Sheets-Sheet 1
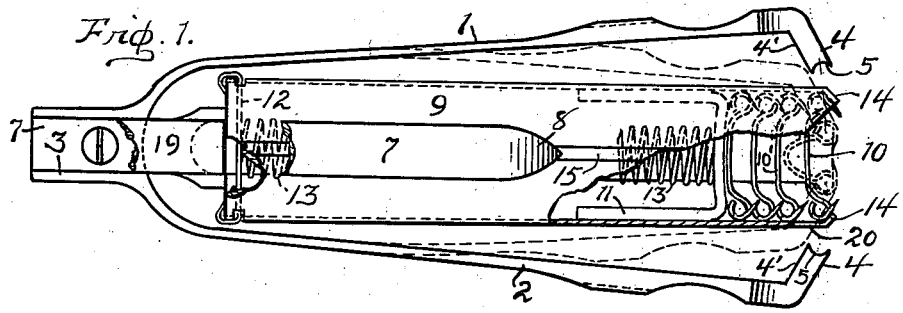
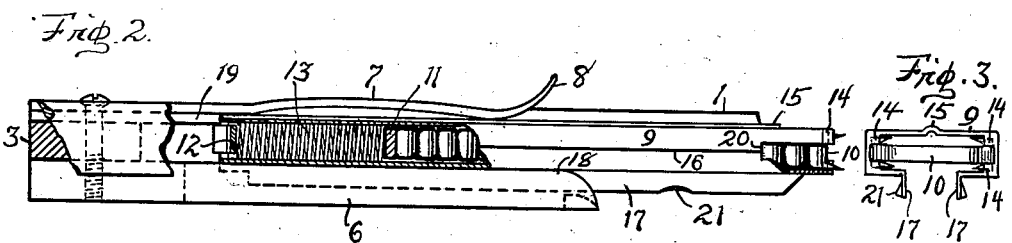
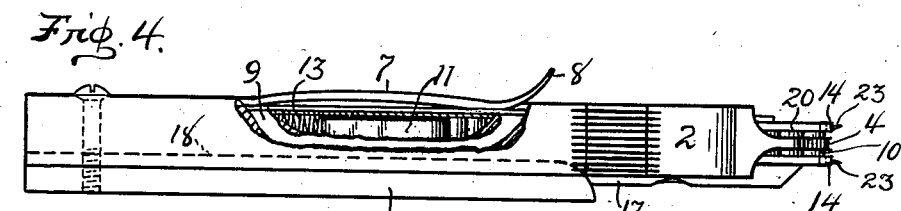
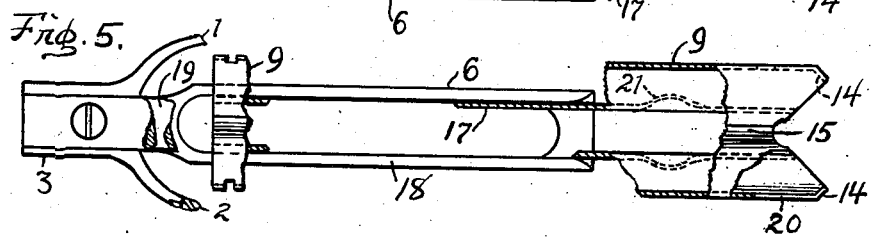
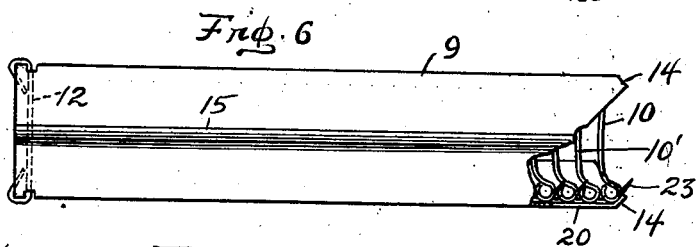
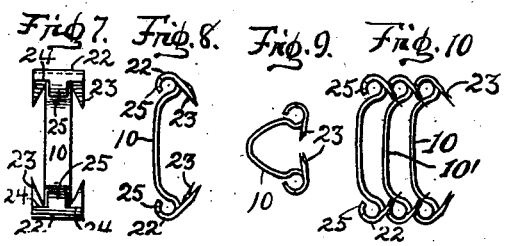
INVENTOR.
Paul D. Dole.
BY
A. G. Burns ATTORNEY.

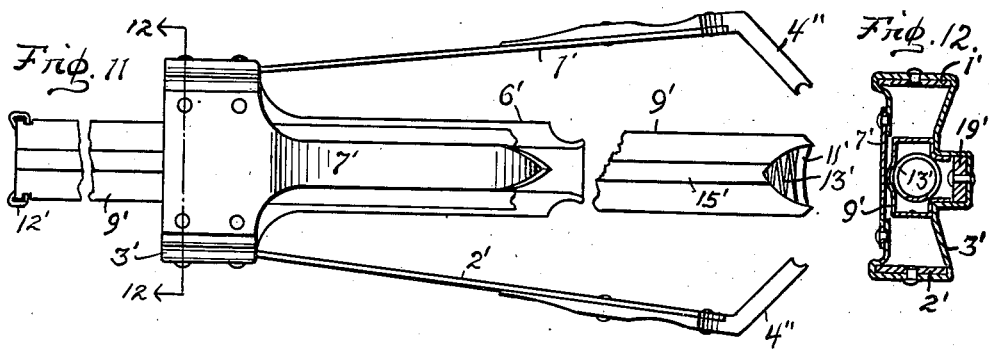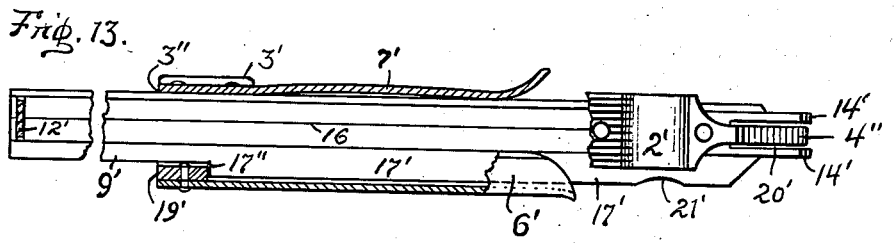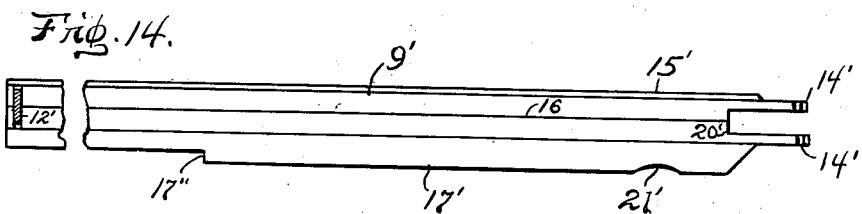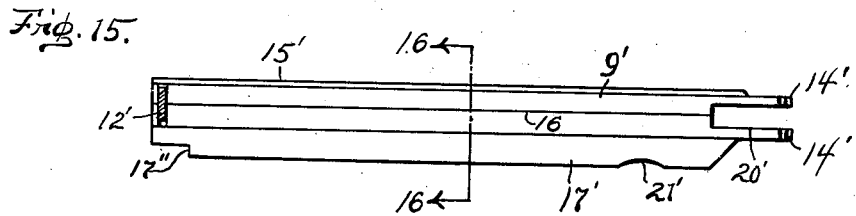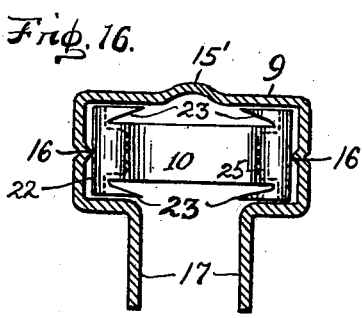

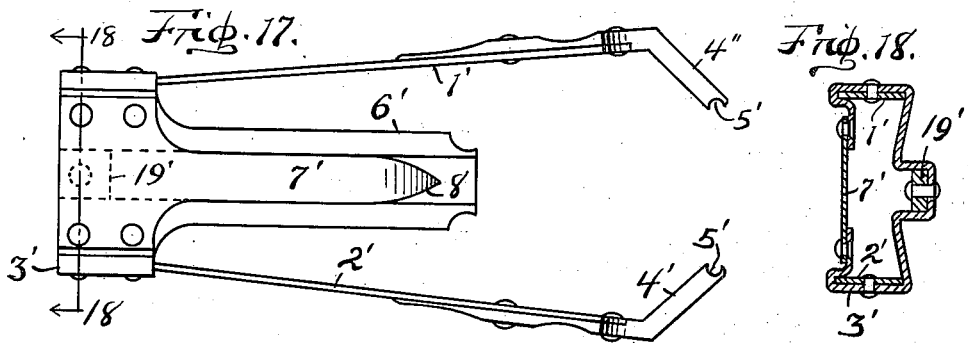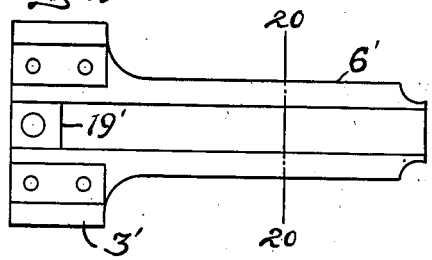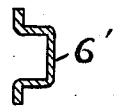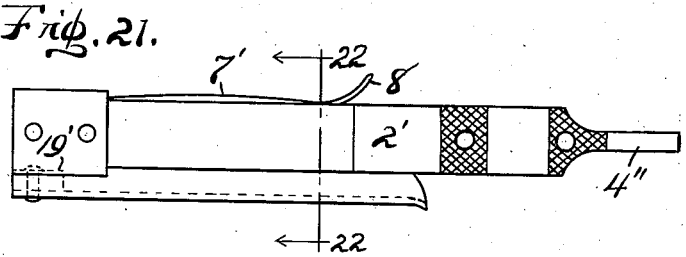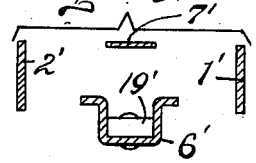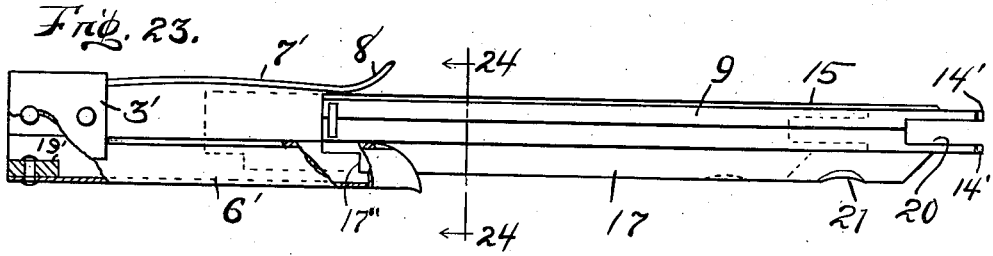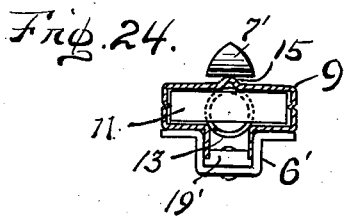

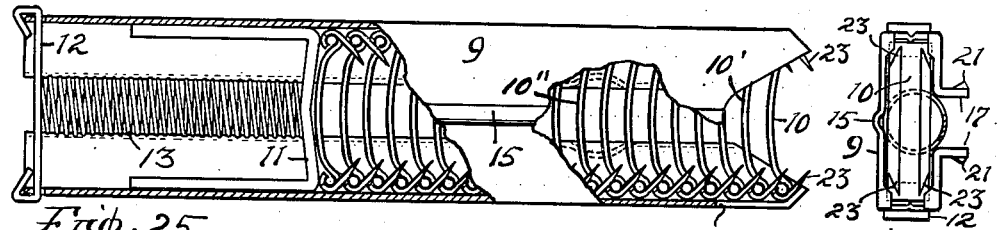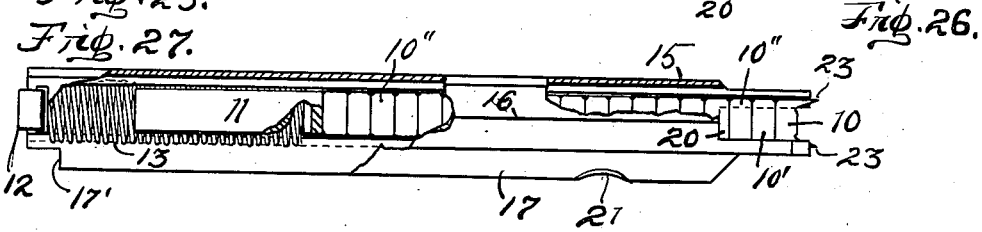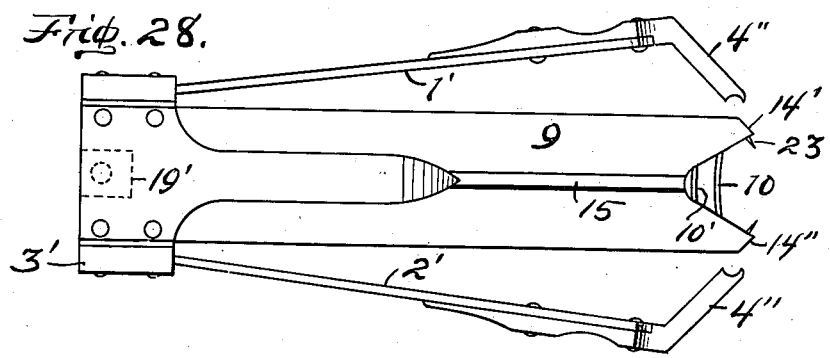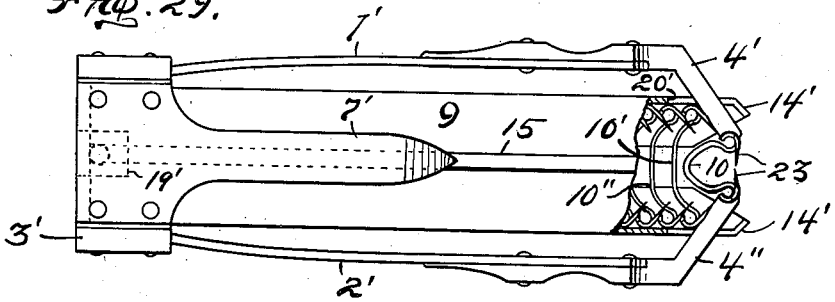

Patented Sept. 16, 1941

2,256,382

UNITED STATES PATENT OFFICE 2,256,382

SURGICAL LIGATURE APPLICATOR

Paul D. Dole, Fort Wayne, Ind., assignor of one-half to Edward H. Kruse, Fort Wayne, Ind.

Application March 6, 1939, Serial No. 260,097

7 Claims. (Cl. 1—49.1)

This invention relates to surgical ligature applicators of that type wherein clips are arranged within a magazine and applied in successive order by forceps associated with the magazine containing the clips for closing incisions or lacerations in flesh.

One of the objects of the invention is to provide an instrument consisting of forceps in conjunction with a clip magazine arranged cooperatively therewith whereby ligatures are applied singly in succession in making sutures.

Other objects and advantages of the invention will appear in the following description.

An illustrative embodiment of the invention is shown in the accompanying drawings, in which:

Fig. 1 is a top plan view of a surgical ligature applicator having tweezers and a magazine containing ligatures to be applied showing the tweezers in extended position and with a ligature in position ready to be applied;

Fig. 2 is a side elevation projected from Fig. 1, portions thereof being broken away to disclose the interior of the magazine;

Fig. 3 is a view of the front end of the structure shown in Fig. 2 in a plane at right angles thereto, parts in the background being omitted;

Fig. 4 is another side elevation of the appliance with a portion broken away showing exterior and interior parts thereof;

Fig. 5 is a fragmentary top plan view of the instrument, and the magazine associated therewith;

Fig. 6 is a top plan view of the clip magazine used in the instrument, a portion thereof being broken away disclosing clips nested therein;

Fig. 7 is a back view of one of the clips that is applied by the instrument;

Fig. 8 is a side elevation projected from Fig. 7;

Fig. 9 is a side view of the clip as it appears after it has been clinched, or partially clinched;

Fig. 10 is a side elevation of a group of clips nested together for arrangement in the magazine preparatory for use;

Fig. 11 is a top plan view of the applicator in modified form including the suture magazine;

Fig. 12 is a transverse section projected from Fig. 11, the section being on the line 12—12 thereof;

Fig. 13 is a side view projected from Fig. 11, portions thereof being broken away showing the manner of securing the magazine in place;

Fig. 14 is a side view of a magazine of the type used in the modified form of the instrument shown in Fig. 11, a portion thereof being broken away;

Fig. 15 is a side view of a magazine of the type adapted for use with either form of the instrument;

Fig. 16 is a transverse section of Fig. 15 on the line 16—16 thereof, the view being drawn to an enlarged scale, and including a clip;

Fig. 17 is a top plan view of the instrument in the form shown in Fig. 11 without the magazine;

Fig. 18 is a cross-sectional view of Fig. 17 on the line 18—18;

Fig. 19 is a top plan view of the magazine holder constituting part of the instrument shown in Fig. 17;

Fig. 20 is a cross-sectional view projected from Fig. 19, the section being on the line 20—20 thereof;

Fig. 21 is a side view showing an elevation projected from Fig. 17;

Fig. 22 is a cluster of cross-sectional views showing parts projected from Fig. 21, the section being on the line 22—22 thereof;

Fig. 23 is a side view of the instrument in the form shown in Figs. 11 and 17, a portion thereof being broken away, and including a clip magazine of the form shown in Fig. 15 in position for insertion thereof into the instrument;

Fig. 24 is a transverse sectional view of Fig. 23 on the line 24—24 thereof;

Fig. 25 is a top plan view of a magazine loaded with clips, portions being cut away to show the relative arrangement of parts;

Fig. 26 is a front end elevational view projected from Fig. 25;

Fig. 27 is a side view projected from Fig. 25, portions being broken away to disclose the interior thereof;

Fig. 28 is a top plan view of the instrument in the form shown in Fig. 17 together with a magazine therein positioned in readiness for use; and Fig. 29 is a top plan view of the instrument and magazine of the form shown in Fig. 28, the magazine being shown partly cut away to disclose its contained clips and the tweezers in clinching position.

The illustrative embodiment of the invention, shown in Figs. 1 to 6 inclusive, has forceps constituted of tweezer arms 1 and 2, secured to a base member 3, the outer ends of which have inturned jaws 4, said arms being made of spring material and normally spread apart. The termini of said jaws have concavities 5 made therein for the purpose hereinafter explained.

The base 3 also has secured thereto, and extending longitudinally therefrom between said arms, a channeled magazine holder 6, and also a spring tongue 7 extending parallel with and spaced above said holder, the outer end of said tongue terminating with an upturned tip 8.

There is provided a magazine 9 adapted to be removably positioned in the channeled holder 6 and held therein by said tongue, the magazine being so constructed as to contain therein a group of ligatures or clips 10—10'—10". Within the magazine is disposed a movable plunger 11, and at the rear end of said magazine is secured a cross head 12. Between the plunger 11 and said cross head is disposed a compression spring 13 whereby pressure is exerted forwardly against the group of clips in the magazine.

The front end of the magazine is open except for the laterally inturned shoulders 14 that engage and detain, in position for application, the outermost one 10 of the group of clips that are disposed within the magazine until the clinching operation of the tweezers has been applied to said outermost clip, after which the clinched clip 10 is freed from between said shoulders upon subsequent outward movement of the jaws 4.

The magazine 9 has a longitudinal rib 15 on its top, and also internal longitudinal ridges 16 between which the nested clips 10—10'—10" are movably disposed while contained within the magazine. The ridges hold the clips from contact with the side walls of the magazine and prevent stalling of the clips therein.

Preferably, the magazine is formed of thin sheet metal, shaped to house a group of the nested clips, and the bottom of the magazine has downwardly extending parallel flanges 17 that are spaced apart and snugly fit between the sides 18 of the holder 6 and the magazine is frictionally held in operative position on the holder by pressure of the spring 7 upon the rib 15. A stationary stop 19 is secured upon the base member 3 and extends forwardly beneath the tongue 7 so as to have engagement with the magazine thus to limit inward movement thereof when inserted in the forceps. The magazine 9 is made of such length that when its rear end bears against the stop 19 its forward end then will be held disposed between the jaws 4 of the tweezers so that when the tweezers are operated the jaws become projected correspondingly through slots 20, made in the sides of the magazines, and engage the ends of the endmost clip 10. Thus, said endmost clip is clasped lengthwise between the jaws of the tweezers with its ends snugged in the concavities 5 thereof in readiness for the clinching operation which is carried out by applying additional pressure to the tweezers to move the jaws toward each other.

The jaws 4 are inclined forwardly and convergently and are sufficiently thin as to extend freely through the slots 20 in the side walls of the magazine as they engage and clinch the endmost clip 10. As the jaws 4 are disposed convergently, their rear faces 4' slant and come into contact with the second clip 10' during the clinching operation of the endmost clip 10 and move the entire group of clips 10'—10" backwardly in the magazine thus affording clearance for the clip 10 during the clinching operation. When the endmost clip has been clinched it is freed from the shoulders 14, and when the tweezer jaws move outwardly the clinched clip is released entirely from the instrument, and at the same time the next succeeding clip is advanced to position behind the shoulders 14, through action of the spring 13, in readiness to be clinched.

The magazine 9 is made of such width as to accommodate correspondingly the size of the clips to be used, the width of the magazine being made proportionate to the lengths of the particular clips to be encased in the magazine. For convenience in removing from and inserting the magazine in the forceps, the flanges 17, at a point near their forward ends, are sprung outwardly to provide a finger-hold 21 which enables the operator manually to apply endwise pressure in inserting and removing the magazine.

The clips 10—10'—10" herein illustrated are of a preferred form and are preferably made of thin plate metal shaped to have rounded backturned ends 22 and forwardly convergent spurs 23 at the sides of the clips. The terminals of the backturned portions 22 have made therein notches 24 between which are disposed corresponding tongues 25. By this arrangement the spurs 23 at each end of the clip are spaced apart which permits nesting of the clips together so that the spurs of one clip straddle the corresponding tongues 25 on the preceding clip. Thus the clips, when nested together in the magazine, are held in a compact group and tend to sustain each other in proper position to be fed forwardly and clinched in successive order by operation of the tweezers.

In the modified form of the instrument shown in Figs. 11, 12 and 13, and Figs. 17 to 24 inclusive there are provided tweezer arms 1' and 2' secured to a base member 3', the arms being provided with jaws 4" that are disposed convergently as in the former instance. There are secured to the base a channeled holder 6' and also a spring tongue 7' that extends parallel with and spaced above said holder whereby to secure the magazine in operative position.

The base 3', in this form of the instrument has therein an opening 3" extending longitudinally therethrough made to accommodate the rear end of the magazine 9' of the form shown in Figs. 13 and 14, that extends therethrough when the magazine is placed in operative position in the forceps.

In this instance, the magazine extends beyond the base 3' of the instrument so as to accommodate a corresponding greater number of clips. It is essential, however, when a magazine is operatively positioned in the forceps, that its forward end then is located between the jaws 4" so that when the tweezers are operated the jaws will grasp the endmost clip 10 in the magazine as in the former instance.

In order to insure proper location of the magazine in the forceps upon insertion therein, the flanges 17' on the magazine are reduced in size at their rear ends to provide shoulders 17" that abut the forward end of a stop 19' located in the base member 3' thereby limiting rearward movement of the magazine in the forceps at the definite point when the front end of the magazine is properly located between the tweezer jaws to permit clinching of the endmost clip 10.

The magazines 9 and 9' are each made of such breadths as to accommodate clips of various lengths.

The magazine 9' shown in Fig. 15 is such as to be adapted for use in either form of forceps shown in Figs. 1 and 11. When inserted in the forceps, shown in Fig. 1, the upper rear end of the magazine 9 of the form shown in Figs. 1, 6 and 15, abuts the stop 19, and when the magazine is inserted in the forceps, shown in Figs. 11, 13, 17, 23, 28 and 29, the shoulders 17" abut the stop 19' in the base 3'. In each instance the rearward movement of the magazine, when inserted in the forceps, is estopped definitely at the point when the front end of the magazine is in precise position between the tweezer jaws for clinching of the endmost clip 10 therein. The distinguishment between the two types of instruments is that in the form shown in Figs. 1 to 5 inclusive, the base member 3 is closed and the stop 19 is located in the upper part thereof beneath the spring tongue 7 so that the magazine has contact at its rear end with the stop and thus becomes properly located in the instrument. The instrument, shown in Figs. 11, 13, 17, 23, 28 and 29, having in its base 3' the opening 3'' and the stop 19' located in the lower part thereof, permits use of either one of the magazines (Figs. 14 and 15) selectively, as in each form of magazine there are provided shoulders 17'' located at a definite distance from the discharge end thereof, which shoulders have contact with the stop 19' and thus the magazine becomes properly located in the instrument. In this instance the rear end of the magazine of either form is permitted to enter the opening 13'' so that the shoulders 17'' contact with the stop 19'.

In use, preferably, the clips are supplied grouped in the magazines in readiness for insertion into the forceps. Preparatory to use, the forceps, magazine and contained clips bodily are subjected to sterilization by the customary method, after which the clips are clinched in successive order as they are applied to the incision or wound by manipulation of the tweezer arms.

When the quantity of clips in the magazine have become exhausted, the magazine is withdrawn from the forceps and discarded, and is then replaced by another clip-filled magazine for subsequent use.

Variations from the particular construction above disclosed may readily be made by exercise of engineering skill without departure from the spirit or scope of the invention, and the following claims are intended to be inclusive of such variations.

What I claim is:

1. A surgical ligature applicator consisting of tweezers having a base and convergent jaws, and provided with a magazine holder, a magazine stop and a spring tongue for retaining a magazine in said holder against said stop, in combination with a clip-holding magazine removably secured in said holder having an opening in its front end and lateral inturned shoulders adjacent said opening to detain the clips contained in said magazine in position to be clinched, and provided with spring actuated means to move said clips against said shoulders, said jaws being disposed to clinch said clips successively upon operation of the tweezers when the magazine is in place and simultaneously move the unclinched clips backwardly to afford clearance for the clip being clinched.

2. In a surgical ligature applicator, tweezers having a base with an opening extending longitudinally therethrough, and provided with a magazine holder and a magazine stop, a clip-containing magazine provided with guide flanges having shoulders located at a point spaced from the rear end thereof engageable with said stop when said magazine is positioned in said holder with its rear end extending through the base opening, and means in connection with said base for retaining the magazine in place, said magazine having an open forward end and contiguous side slots therein and lateral inturned shoulders in said end to detain unclinched clips within said magazine, said tweezers upon operation thereof being adapted to clinch and release from the magazine said clips singly in successive order.

3. A surgical ligature applicator consisting of tweezers having a base and movable jaws and provided with a magazine holder and means for retaining a magazine in said holder, in combination with a clip-holding magazine removably secured in said holder, the front end of said magazine having an opening and lateral inturned shoulders adjacent said opening adapted to detain the clips contained in the magazine in clinching position between said jaws, and provided with spring-actuating means to move said clips against said shoulders, said jaws being disposed to clinch said clips successively upon operation of the tweezers when the magazine is in place.

4. A surgical ligature applicator consisting of tweezers having movable jaws and provided with a magazine holder and means for retaining a magazine in said holder, in combination with a clip-holding magazine removably secured in said holder in a definite position so that the outer end of the magazine is disposed between said jaws, the outer end of said magazine having an opening therein and lateral inturned shoulders adjacent said opening adapted to detain the clips in the magazine at the opening there to be clinched, and provided with means to feed said clips toward said shoulders, said jaws being formed and arranged so as to clinch said clips successively upon operation of the tweezers and simultaneously move the remaining clips in the magazine backwardly thus to afford clearance for each clip as it is clinched.

5. In a surgical ligature applicator, tweezers having movable jaws and provided with a magazine holder and means for retaining a magazine removably in said holder, and a clip-holding magazine having an open slotted end provided with inturned shoulders adjacent said end to detain clips in the magazine in position to be clinched by said jaws upon operation of said tweezers, and provided with spring-actuated means to feed said clips toward said shoulders, said shoulders being so formed as to release each clip upon being clinched.

6. In a surgical applicator, tweezers having movable jaws and provided with a magazine retaining means, and a clip-holding magazine removably positioned in said retaining means, one end of said magazine having an opening therein and means adjacent said opening for detaining unclinched clips within said magazine and provided with means for feeding said clips toward said opening, said detaining means being such as to permit release of each clip upon being clinched between said jaws.

7. In a surgical ligature applicator, a clip-holding magazine having an open slotted end and clip-retaining shoulders adjacent the opening in said end and provided with spring-actuated means within said magazine for feeding clips contained therein toward said shoulders, the arrangement of said open-slotted end and shoulders being such that release of said clips from the magazine is dependent upon clinching of the individual clips, and tweezers having a magazine holder in which said magazine is removably retained in a position to permit clinching of said clips individually in successive order by operation of said tweezers.

PAUL D. DOLE.